United States Patent Office 3,452,060
Patented June 24, 1969

3,452,060
17-HYDROXY-17-(3-OXO-1-PROPYNYL OR-PROPENYL) STEROIDS
Robert G. Christiansen, Schodack, and Theodore C. Miller, East Greenbush, N.Y., assignors to Sterling Drug Inc., New York, N.Y., a corporation of Delaware
No Drawing. Filed Feb. 1, 1967, Ser. No. 613,084
Int. Cl. C07c *169/08, 169/20*
U.S. Cl. 260—397.4        10 Claims

ABSTRACT OF THE DISCLOSURE

Certain 17-hydroxy steroids having a 3-oxo-1-propynyl or 3-oxo-1-propenyl group in the 17-position are prepared either by manganese dioxide oxidation of the corresponding 17-(3-hydroxy-1-propynyl) or 17-(3-hydroxy-1-propenyl) compounds, or by reaction of an alkali metal derivative of propargyl aldehyde di-lower-alkyl acetal with the appropriate 17-oxo steroid, followed by hydrolysis. The compounds are useful as estrogenic and hypocholesteremic agents, and advantageously modify the electrolyte balance in animal organisms.

---

This invention relates to new steroid compounds and their preparation, and in particular is concerned with certain steroids having an unsaturated aliphatic aldehyde group in the 17-position, with methods for the preparation thereof, and with intermediates in the preparation thereof.

One aspect of the invention is concerned with compounds of the formula

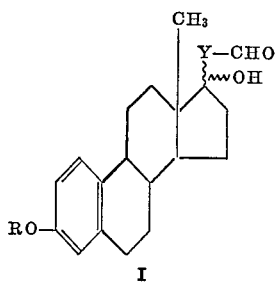

I wherein R is hydrogen or lower-alkyl, and Y is C≡C or CH=CH.

In the above formula I the lower-alkyl group, R, can have from one to about six carbon atoms. Examples of such alkyl groups are methyl, ethyl, propyl, isopropyl, butyl, pentyl, hexyl and the like.

The compounds of Formula I are prepared by oxidizing compounds of the formula

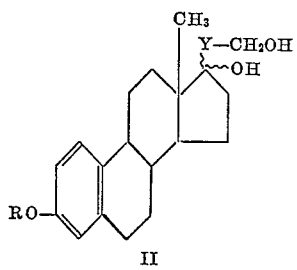

II with manganese dioxide. The groups R and Y have the same meaning given hereinabove. The oxidation reaction can be carried out at room temperature in an inert organic solvent.

An alternative procedure for the preparation of compounds of Formula I wherein Y is C≡C comprises reacting estrone or estrone lower-alkyl ether with an alkali metal derivative of propargyl aldehyde di-lower-alkyl acetal, M—C≡CCH(OR')$_2$, wherein M is lithium, sodium or potassium, to afford an intermediate of the formula

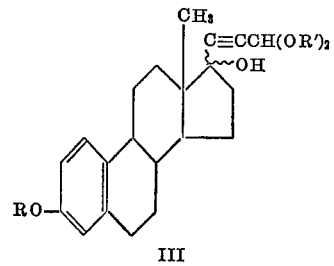

III

The acetal of Formula III is then cleaved with acid to produce a compound of Formula I where Y is C≡C.

In the compounds of Formula III, the group R', like the group R, is a lower -alkyl group having from one to about six carbon atoms.

A further aspect of the invention is concerned with compounds of the formula

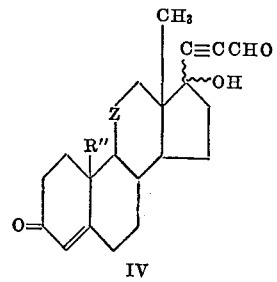

IV wherein R″ is hydrogen or methyl, and Z is CH$_2$ or C=O; or a compound of the above formula having an additional double bond in the 1,2-position, R″ being methyl.

The compounds of Formula IV are prepared by methods analogous to those used in the preparation of compounds of Formula I, that is, by manganese dioxide oxidation of the corresponding hydroxypropynyl derivatives of formula

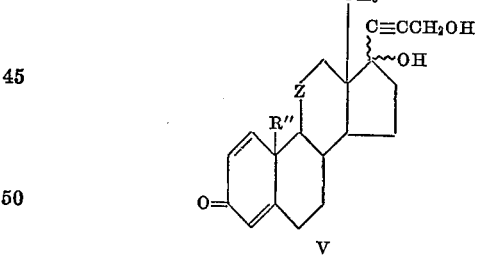

V or by reacting the appropriate 17-oxo compound of the formula

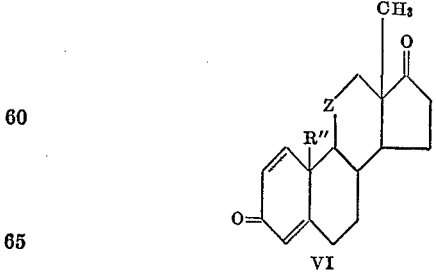

VI or a 3-enol ether thereof with an alkali metal derivative of propargyl aldehyde di-lower-alkyl acetal, followed by acid cleavage of the resulting 17-(3-di-lower-alkyl-1-propynyl) compound.

The compounds of Formulas I–V, inclusive, can have the unsaturated side chain at the 17-position in either the α- or β-configuration. The reaction of a 17-oxo steroid with a metal derivative of an alkyne compound in most instances leads to a predominance of the isomer having the side chain in the α-position; however, appreciable amounts of the β-isomer can be obtained by varying the reaction conditions and nature of the reagents.

The structures of the compounds were verified by the modes of preparation, by elementary analysis, by ultraviolet, infrared and nuclear magnetic resonance spectral determinations, and by following the corse of the reactions by thin layer chromatography.

Biological evaluation of the compounds of the invention, including compounds of Formulas I, III and IV, has shown that they possess useful endocrinological properties, in particular estrogenic and hypocholesteremic activity, and the ability to advantageously modify the electrolyte balance in animal organisms. They cause sodium retention without alteration in potassium excretion, and demonstrate evidence of corticoid as well as antiadrenal activity.

The compounds of the invention are prepared for use by formulation in the same manner as known steroid hormones, for example, in aqueous or oil suspension or solution for parenteral administration, or in tablet form with excipients for oral administration.

The following examples will further illustrate the invention without the latter being limited thereby.

EXAMPLE 1

3 - methoxy - 17 - (3-oxo-1-propynyl)-1,3,5(10)-estratrien-17β-ol [I; R is $CH_3$, Y is $C \equiv C$, 17β-OH]. A solution of 6.77 g. of 3-methoxy-17-(3-hydroxy-1-pyropynyl)-1,3,5(10)-estratrien-17β-ol in 300 ml. of chloroform was stirred with 33.8 g. of manganese dioxide for six hours at room temperature. The mixture was filtered, the filtrate evaporated to remove the solvent, and the residue chromatographed in 190 g. of silica gel. The column was eluted with pentane-ether (1:1), and the product recrystallized twice from acteonirtile to give 2.62 g. of 3-methoxy-17 - (3-oxo-1-propynyl)-1,3,5(10)-estratrien-17β-ol, beige prisms, M.P. 140–141.5° C., $[\alpha]_D^{25}=-26.8°$ (1% in chloroform).

Similarly, 17 - (3-hydroxy-1-propynyl)-1,3,5(10)-estratriene-3,17β-diol can be oxidized with manganese dioxide to give 17 - (3 - oxo - 1-propynyl)-1,3,5(10)-estratriene-3,17β-diol [I; R is H, Y is $C \equiv C$, 17β-OH].

EXAMPLE 2

3 - methoxy - 17 - (3,3 - diethoxy - 1 - propynyl) - 1,3,5 (10)-estratrien-17-ol [III; R is $CH_3$, R' is $C_2H_5$]. Propargyl aldehyde diethyl acetal [10.25 g., B.P. 75–6° C. (72 mm.), $n_D^{25}=1.410$] was added dropwise to a solution of 3.13 g. of potassium in 200 ml. of liquid ammonia, held under reflux by a Dry Ice condenser and protected from atmospheric moisture by a drying tube. Pyridine (200 ml.) was then added, followed by 10.81 g. of estrone methyl ether. The condenser was removed, the ammonia allowed to evaporate, and the mixture was blanketed with nitrogen and stirred at room temperature for four hours. The reaction mixture was quenched in 1 liter of water containing 4.27 g. of ammonium chloride. The mixture was extracted with chloroform and the extracts were washed with water, dried over anhydrous sodium sulfate, filtered and concentrated to remove the solvent. The residue was chromatographed on 800 g. of alumina. The column was eluted first with pentane-ether (8:2) which brought out 0.66 g. of unchanged estrone methyl ether; and then eluted with pentane ether (7:3) to afford as the first eluted product, 3 - methoxy - 17 - (3,3-diethoxy-1-propynyl)-1,3,5(10)- estratrien-17β-ol, 3.22 g., colorless needles, M.P. 99–100° C., $[\alpha]_D^{25}=-8.8°$ (1% in chloroform) after two recrystallizations from hexane; and as the second product 3-methoxy - 17 - (3 - diethoxy - 1 - propynyl) - 1,3,5(10)- estratrien-17α-ol, 0.85 g., colorless blades, M.P. 94–95° C., $[\alpha]_D^{25}=+62.2°$ (1% in chloroform) after two recrystallizations from hexane.

Similarly, estrone can be reacted with the potassium derivative of propargyl aldehyde diethyl acetal to give 17-(3,3-diethoxy-1-propynyl)-1,3,5(10) - estratriene - 3,17β-diol and -3,17α-diol [III; R is H, R' is $C_2H_5$].

EXAMPLE 3

A solution of 0.41 g. of 3-methoxy-17-(3,3-diethoxy-1-propynyl)-1,3,5(10)-estratrien-17β-ol (Example 2) in 9.0 ml. of acetic acid and 1.0 ml. of water was allowed to stand for 24 hours and then diluted to 100 ml. with water. The solid product was collected and dried to give 0.33 g. of 3-methoxy-17-(3-oxo-1-propynyl)-1,3,5(10)-estratrien-17β-ol, M.P. 139–141° C., the same compound as that prepared in Example 1.

EXAMPLE 4

3-methoxy-17-(3-oxo-1-propynyl)-1,3,5(10)-estratrien-17α-ol

[I; R is $CH_3$, Y is $C \equiv C$, 17α-OH] was prepared by acetic acid treatment of 3-methoxy-17-(3,3-diethoxy-1-propynyl)-1,3,5(10)-estratrien-17α-ol (Example 2) according to the procedure of Example 3. The product had the M.P. 94–98°C., $[\alpha]_D^{25}=+75.5°$ (1% in chloroform) when recrystallized from acetonitrile.

Similarly, 17-(3,3-diethoxy-1-propynyl)-1,3,5(10)-estratriene-3,17-diol and -3,17α-diol can be hydrolyzed to give 17-(3-oxo-1-propynyl)-1,3,5(10)-estratriene-3,17β-diol and -3,17α-diol [I; R is H, Y is $C \equiv C$].

3-methoxy-17-(3-oxo-1-propynyl)-1,3,5(10) - estratrien-17α-ol can also be prepared by manganese dioxide oxidation of 3-methoxy-17-(3-hydroxy-1-propynyl)-1,3,5(10)-estratrien-17α-ol [M.P. 153.2–154.8° C., $[\alpha]_D^{25}=+65.1°$ (1% in chloroform), prepared by chromatography of the mother liquors from the preparation of the 17β-hydroxy isomer from estrone methyl ether and the potassium derivative of propargyl alcohol].

EXAMPLE 5

3-methoxy - 17 - (3 - oxo - cis - 1 - propenyl)-1,3,5(10)- estratrien-17β-ol [I; R is $CH_3$, Y is CH=CH, 17β-OH, cis configuration about double bond] was prepared from 6.85 g. of 3-methoxy-17-(3-hydroxy-cis-1-propenyl)-1,3,5 (10)-estratrien-17β-ol and 34.25 g. of manganese dioxide in 300 ml. of chloroform according to the procedure of Example 1. The product had the M.P. 172–175° C. (immersed at 168° C.; gas evolution) when recrystallized from a methylene dichloride-acetonitrile mixture; $[\alpha]_D^{25}=+97.7°$ (1% in chloroform).

EXAMPLE 6

3 - methoxy - 17 - (3-oxo-trans-1-propenyl)-1,3,5(10)- estratrien-17β-ol [I; R is $CH_3$, Y is CH=CH, 17β-OH, trans configuration about double bond] was prepared from 1.60 g. of 3-methoxy-17-(3-hydroxy-trans-1-propenyl)-1,3,5(10)-estratrien-17β-ol and 8.0 g. of manganese dioxide according to the procedure of Example 1. The product had the M.P. 175–178° C. when recrystallized from acetonitrile; $[\alpha]_D^{25}=+35.0°$ (1% in chloroform).

EXAMPLE 7

17β-hydroxy-17-(3-oxo-1-propynyl) - 4 - androsten - 3-one [IV; R" is $CH_3$, Z is $CH_2$, 17β-OH]. Propargyl aldehyde diethyl acetal (5.13 g.) was added dropwise over a period of twenty minutes to a stirred solution of 0.27 g. of lithium in 100 ml. of liquid ammonia. Pyridine (100 ml.) was then added rapidly followed by 6.29 g. of 3-ethoxy-3,5 - androstadien - 17 - one. The reaction mixture was blanketed with nitrogen and the ammonia evaporated on a steam bath until the temperature reached 25° C. After 45 hours at room temperature, 2.14 g. of ammonium chloride and 50 ml. of chloroform were added, and the mixture was quenched in 500 ml. of water. The chloroform layer was separated and the aqueous layer extracted with chloroform. The combined chloroform solutions were washed with water, dried over anhydrous sodium sulfate, filtered and concentrated to a red-brown oil. The latter, comprising 17β - hydroxy - 17 - (3,3-diethoxy-1-propynyl)-4-androsten-3-one, was dissolved in 100 ml. of acetic acid and 20 ml. of water. The reaction mixture was kept thirteen days at room temperature, then quenched in 1 liter of water and extracted with chloroform. The chloroform extracts were washed with sodium bicarbonate solution, dried over anhydrous sodium sulfate and potassium bicarbonate, and concentrated to remove the solvent. The residue was dissolved in methylene dichloride, dried over 20 g. of silica gel and chromatographed on 180 g. of silica gel. The column was eluted first with pentane-ether and then with ether. The latter brought out 3.02 g. of 17β-hydroxy-17-(3-oxo-1-propynyl)-4-androsten-3-one, colorless blades, M.P. 171–173° C. when crystallized twice from acetonitrile.

17β-hydroxy-17-(3-oxo-1-propynyl)-4-androsten-3-one can also be prepared by manganese dioxide oxidation of 17β-hydroxy-17-(3-hydroxy-1-propynyl)-4-androsten-3-one, in turn prepared by reacting 3-ethoxy-3,5-androstadien-17-one with the potassium derivative of propargyl alcohol, followed by acid hydrolysis.

By replacing the 3-ethoxy-3,5-androstadien-17-one in the foregoing preparation by a molar equivalent amount of 3-ethoxy-19-nor-3,5-androstadien-17-one, there can be obtained 17β-hydroxy-17-(3-oxo-1-propynyl)-19-nor-4-androsten-3-one [IV; R″ is H, Z is CH₂, 17β-OH].

EXAMPLE 8

(a) 17β-hydroxy-17-(3-hydroxy-1-propynyl)-1,4-androstadiene-3,11-dione [V; R″ is CH₃, Z is C=O, Δ¹, 17β-OH] was prepared from 11.94 g. of 1,4-androstadiene-3,11,17-trione and the potassium derivative from 9.08 g. of propargyl alcohol in liquid ammonia-pyridine solution according to the procedure of Example 2. The product was chromatographed on silica gel and eluted with ether to give 17β-hydroxy-17-(3-hydroxy-1-propynyl)-1,4-androstadiene-3,11-dione, pale yellow powder, [α]_D²⁵ = +88.0° (1% in chloroform).

(b) 17β-hydroxy-17-(3-hydroxy-1-propynyl)-1,4-androstadiene-3,11-dione can be caused to react with manganese dioxide according to the procedure of Example 1 to afford 17β-hydroxy-17-(3-oxo-1-propynyl)-1,4-androstadiene-3,11-dione [IV; R″ is CH₃, Z is C=O, Δ¹, 17β-OH].

We claim:
1. A compound of the formula

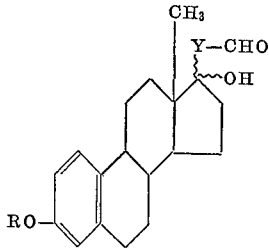

wherein R is hydrogen or lower-alkyl, and Y is C≡C or CH=CH.

2. 3-methoxy-17-(3-oxo-1-propynyl)-1,3,5(10)-estratrien-17-ol, according to claim 1 wherein R is methyl and Y is C≡C.

3. 3-methoxy-17-(3-oxo-1-propenyl)-1,3,5(10)-estratrien-17-ol, according to claim 1 wherein R is methyl and Y is CH=CH.

4. A compound of the formula

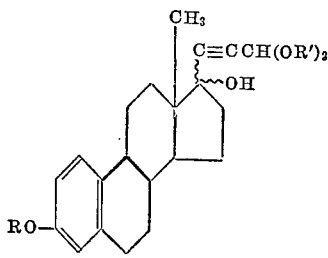

wherein R is hydrogen or lower-alkyl, and R′ is lower-alkyl.

5. 3-methoxy-17-(3,3-diethoxy-1-propynyl)-1,3,5(10)-estratrien-17-ol, according to claim 4 wherein R is methyl and R′ is ethyl.

6. A compound of the formula

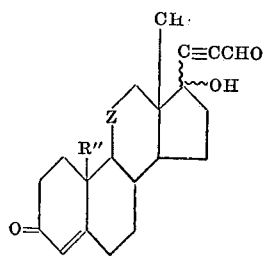

wherein R″ is hydrogen or methyl, and Z is CH₂ or C=O; or a compound of the above formula having an additional double bond in the 1,2-position, R″ being methyl.

7. 17β-hydroxy-17-(3-oxo-1-propynyl)-4-androsten-3-one, according to claim 6 wherein R″ is methyl and Z is CH₂.

8. 17-hydroxy-17-(3-oxo-1-propynyl)-1,4-androstadiene-3,11-dione, according to claim 6 wherein R″ is methyl, Z is C=O and there is an additional double bond in the 1,2-position.

9. A compound of the formula

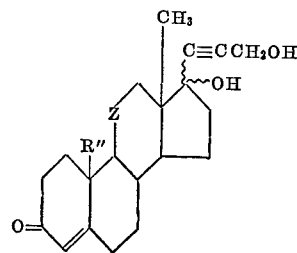

wherein R″ is hydrogen or methyl, and Z is C=O; or a compound of the above formula having an additional double bond in the 1,2-position, R″ being methyl.

10. 17β-hydroxy-17-(3-hydroxy-1-propynyl)-1,4-androstadiene-3,11-dione, according to claim 9 wherein R″ is methyl, Z is C=O, and there is an additional double bond in the 1,2-position.

References Cited

UNITED STATES PATENTS 3,029,261  4/1962  Kincl _____ 260–397.4

OTHER REFERENCES

Djerassi, Steroid Reactions, Holden-Day, Inc., San Francisco, 1963, p. 107.

Noller, Chemistry of Organic Compounds 3rd ed. W. B. Saunders Co., Philadelphia, 1965, p. 228.

ELBERT L. ROBERTS, *Primary Examiner.*

U.S. Cl. X.R.

260—397.5, 397.45, 999